Figure 1A:
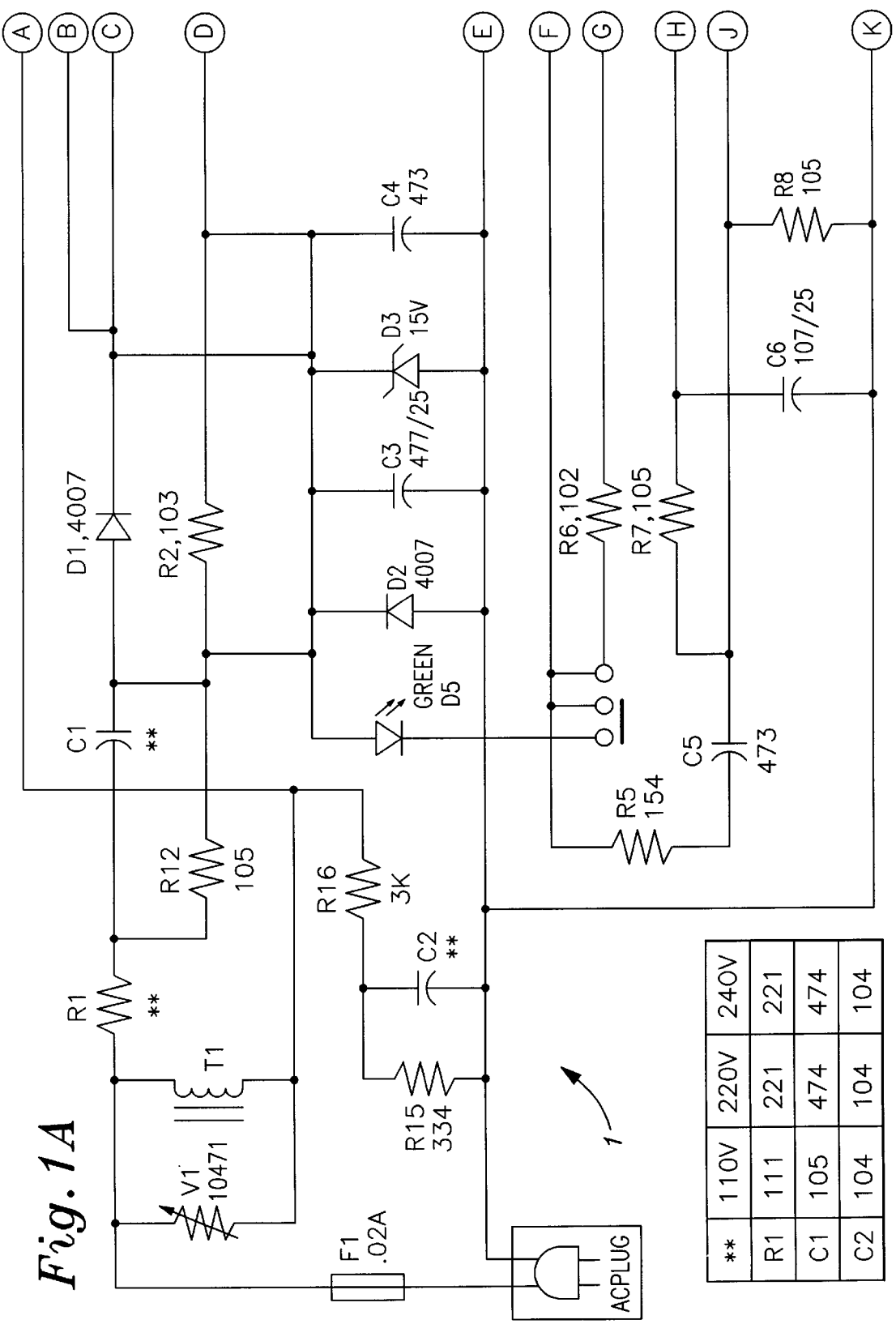
Figure 1B:
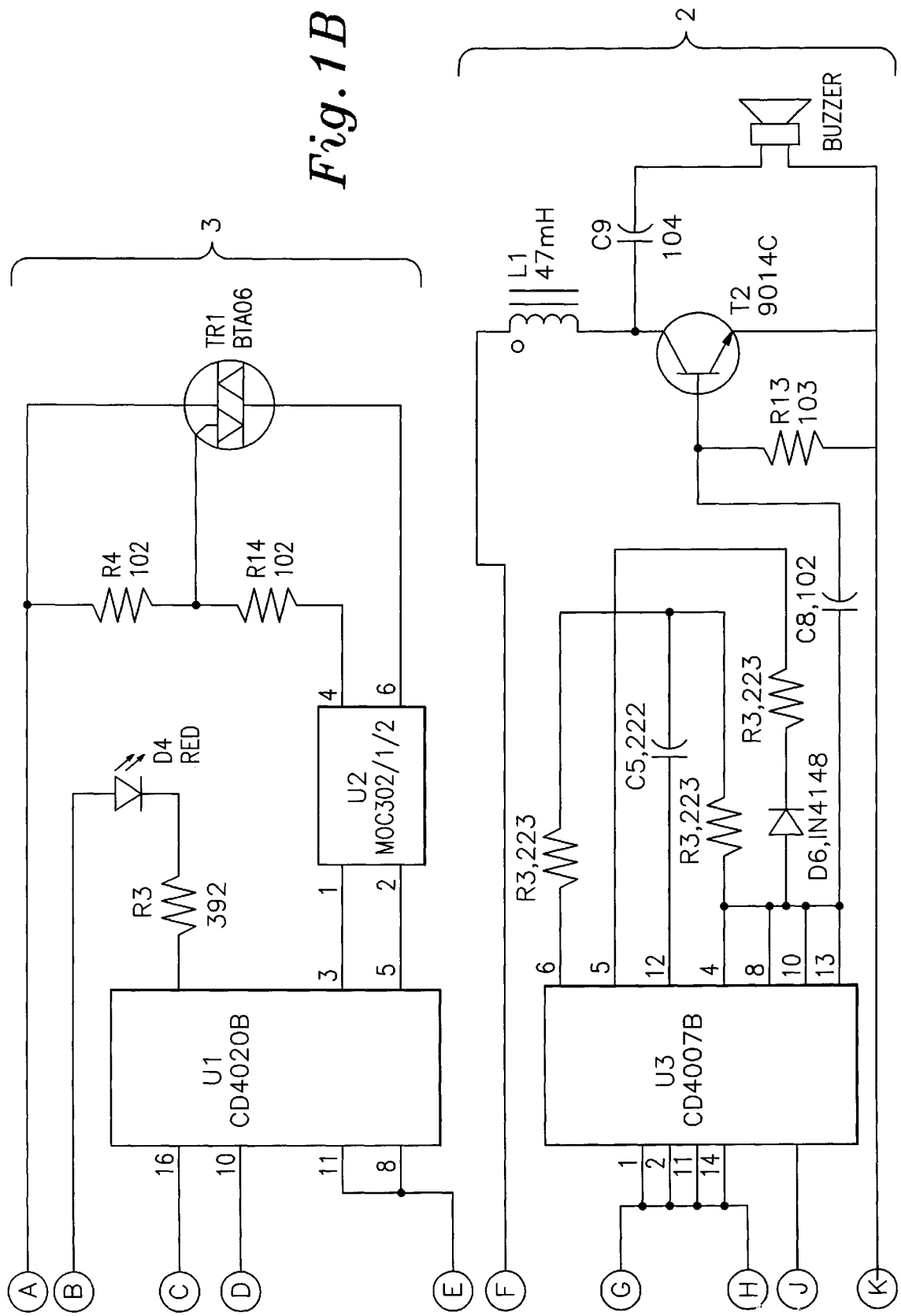

United States Patent [19]
Mah

[11] Patent Number: 5,930,946
[45] Date of Patent: Aug. 3, 1999

[54] METHOD TO REDUCE PEST BY CHANGING THE PROPERTY OF ELECTRICAL CURRENT AND BY PRODUCTION OF ULTRASONIC SOUND

[76] Inventor: Pat Y. Mah, Site 11, Block 12, 8G, Whampoa Garden, Kowloon, The Hong Kong Special Administrative Region of the People's Republic of China

[21] Appl. No.: 08/990,857

[22] Filed: Dec. 15, 1997

[51] Int. Cl.⁶ .................................................. A01M 1/20
[52] U.S. Cl. .............................................................. 43/124
[58] Field of Search ................................... 43/124, 132.1

[56] References Cited

U.S. PATENT DOCUMENTS

| | | | |
|---|---|---|---|
| 3,713,417 | 1/1973 | Shugart | 43/124 |
| 3,831,548 | 8/1974 | Droege | 43/124 |
| 3,872,472 | 3/1975 | Moschgat | 43/124 |
| 3,879,702 | 4/1975 | Mancone | 43/124 |
| 4,178,578 | 12/1979 | Hall | 43/124 |
| 4,484,315 | 11/1984 | Hall | 43/124 |
| 4,616,351 | 10/1986 | Hall | 43/124 |
| 4,870,779 | 10/1989 | Johnson et al. | 43/124 |

Primary Examiner—Thomas Price
Attorney, Agent, or Firm—Curtis L. Harrington

[57] ABSTRACT

The invention relates to a pest control device for generating ultra-sonic sound and for creating an electromagnetic field or altering an existing household electromagnetic field to which pests such as cockroaches, mice, rats and otehr rodents react adversely.

4 Claims, 2 Drawing Sheets

METHOD TO REDUCE PEST BY CHANGING THE PROPERTY OF ELECTRICAL CURRENT AND BY PRODUCTION OF ULTRASONIC SOUND

The present invention relates to a pest control device for generating ultra-sonic sound and for creating an electro-magnetic field or altering an existing household electro-magnetic field to which pests such as cockroaches, mice, rats and other rodents react adversely.

Accordingly, the present invention provides a pest control device comprising an oscillating circuit for producing an ultrasonic signal and a pulsing circuit for inductively loading a power supply to produce a change in the electro-magnetic field of the power supply, whereby the ultrasonic signal and the change in the electro-magnetic field cause adverse effects in pests.

In order that the present invention may be more readily understood, an embodiment thereof will now be described, by way of example, with reference to the accompanying FIGURE which shows a schematic circuit diagram of a pest control device embodying the present invention.

As shown in the FIGURE, a pest control device 1 comprises an oscillating circuit 2 for generating ultrasonic sound of a predetermined range of frequencies and a pulsing circuit 3 for inductively loading a power supply line at predetermined intervals.

Referring to the FIGURE, a mains AC power supply is applied across junction points J1 of the pest control device 1. The supply is, for example, a 220V, 50 Hz A.C. supply. The supply is stepped down by resistor R1 and capacitor C1 then rectified by diodes D1 and D2 and smoothed by zener diode D3 in combination with smoothing capacitor C3 to provide a 15V dc supply.

The 15V do supply powers a frequency divider U1. The frequency divider U1 is provided with an input clock signal CLK which is extracted from the 50 Hz ac power supply. The clock signal CLK is passed through a resistor R2 and filtered by a capacitor C4. The 50 Hz clock signal is divided by the frequency divider by a factor of approximately 15 to produce an output pulse chain having a frequency of approximately 3 Hz (i.e. producing an output pulse approximately every 0.3 seconds). The output pulses are provided in bursts approximately every 2.7 minutes to drive the optical coupler.

The output pulses are applied to an optical coupler U2 which provides the output pule trains to a control gate (pin 1) of triac TR1. The triac TR1 is connected in series with an inductor Ti such that when the triac TR1 is triggered by an output pulse from the optical coupler U2, current is allowed to pass through the triac TR1, thus allowing the mains ac supply-voltage to pass through the inductor T1 thereby inductively loading the ac mains supply. The inductive loading of the mains supply will cause the phase of the ac mains supply to shift thereby altering the electro-magnetic field produced not only by the inductor T1 but also by the ac mains supply. This change in the electro-magnetic field has been found to affect pests such an cockroaches, mice, rate and other rodents adversely. When the output pulse from the optical coupler U2 to the control gate of the triac TR1 stop, the triac is effectively switched off and prevents the inductive loading of the ac means supply.

Thus, the electro-magnetic field of the mains supply is periodically varied at pre-determined intervals.

To prevent damage to the triac TR1 by voltage spikes when being switched on and off, a series RC circuit is connected in parallel across the anode and cathode terminals of the triac TR1 which are shown in the FIGURE as pins 2 and 3.

The 15V dc supply also powers the oscillating circuit 2. The oscillator U3, in the present case, produces an output signal varying by ±8 kHz which is centred at 34 kHz. The output signal is amplified by transistor TR2 and output to a piezoelectric ultrasonic transducer J2 for producing ultrasonic signals at a frequency of approximately 34 kHz.±8 kHz.

The circuits 2, 3 are preferably operated simultaneously but can be operated independently of one another. When being operated at the same time, the ultrasonic signals are produced at approximately 34 kHz but when the triac TR1 is on, the ultrasonic frequency sweeps between 27 and 40 kHz. As shown in the FIGURE, slide switch 4 can be thrown to disable the power supply to the oscillating circuit 2.

To indicate operation of the circuits 2, 3 light emitting diodes D4, D5 are provided which are illuminated when their respective circuits 2, 3 are in operation.

I claim:

1. A pest control device including a circuit comprising:

means for producing an ultrasonic signal;

means for producing an pulsed electromagnetic field including an alternating current input power supply switchably connected to an inductor; and an intermittent controller utilizing an input frequency of said alternating current input power supply to intermittently inductively load said alternating current input power supply to shift the phase of said alternating current input power supply.

2. The pest control device as recited in claim 1 wherein said means for producing an untrasonic signal is also for producing an untrasonic signal which sweeps from about 27 killohertz to about 40 killohertz.

3. The pest control device as recited in claim 1 wherein said switchable connection to said inductor, of said means for producing an pulsed electromagnetic field is a triac.

4. The pest control device as recited in claim 3 and further comprising a frequency divider switching control connected to said alternating current input of said alternating current input power supply, and having an output connected to said triac.

* * * * *